US006616172B1

(12) United States Patent
Cockram

(10) Patent No.: US 6,616,172 B1
(45) Date of Patent: Sep. 9, 2003

(54) FOLDING WHEELCHAIR WITH A POSITIONING ASSEMBLY

(75) Inventor: George R. Cockram, N. Ridgeville, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 09/290,742

(22) Filed: Apr. 13, 1999

(51) Int. Cl.[7] .................................................. B62H 1/00

(52) U.S. Cl. .................. 280/647; 280/304.1; 280/250.1

(58) Field of Search .............................. 280/647, 250.1, 280/42, 639, 649, 650, 304.1; 297/56, 42, 25

(56) References Cited

U.S. PATENT DOCUMENTS

| | | | | | |
|---|---|---|---|---|---|
| 2,675,057 | A | * | 4/1954 | Glass | 280/42 |
| 4,164,354 | A | * | 8/1979 | Rodaway | 280/42 |
| 4,564,212 | A | * | 1/1986 | Orlandino et al. | 280/642 |
| 4,826,241 | A | | 5/1989 | Barras | 297/16 |
| 4,989,890 | A | * | 2/1991 | Lockhard et al. | 280/42 |
| 5,149,120 | A | | 9/1992 | Halliday | 280/304.1 |
| 5,154,438 | A | | 10/1992 | Barclay | 280/250.1 |
| 5,263,728 | A | * | 11/1993 | Patel et al. | 280/42 |
| 5,328,183 | A | * | 7/1994 | Counts | 280/42 |
| 5,560,627 | A | * | 10/1996 | Zatulovsky et al. | 280/42 |
| 5,857,688 | A | * | 1/1999 | Swearingen | 280/250.1 |
| 5,915,709 | A | * | 6/1999 | Radjenovic et al. | 280/250.1 |
| 6,073,951 | A | * | 6/2000 | Jindra et al. | 280/304.1 |

FOREIGN PATENT DOCUMENTS

| | | |
|---|---|---|
| CH | 219 516 | 2/1942 |
| FR | 2 258 818 | 8/1975 |
| WO | 99/17700 | 4/1999 |

* cited by examiner

*Primary Examiner*—Brian L. Johnson
*Assistant Examiner*—J. Allen Shriver
(74) *Attorney, Agent, or Firm*—Calfee, Halter & Griswold; Nenad Pejic; Paul E. Szabo

(57) ABSTRACT

A foldable wheelchair includes a pair of side frames each of which have generally horizontal upper and lower members which are connected by generally vertical front and back legs. A pair of cross arms are located between the side frames and each arm has a base portion connected to a lower side frame member. A top portion of each cross arm is connected to an upper side frame member through a positioning link. The side frames are laterally and vertically positioned with respect to each other by a pair of positioning braces each located on a base portion of a different cross brace. Each brace contacts the top portion of the remaining cross brace and thus positions the side frame. The wheelchair has a removable rigid seat to permit access to the cross braces so the wheelchair can be folded.

9 Claims, 6 Drawing Sheets

FOLDING WHEELCHAIR WITH A POSITIONING ASSEMBLY

FIELD OF INVENTION

Foldable wheelchairs including power wheelchairs usually contain a cross brace structure. The cross brace assembly of the present invention is self-supporting and has a positioning assembly so that the side frames of the wheelchair can be laterally and vertically positioned with respect to one another.

BACKGROUND OF INVENTION

Foldable wheelchairs have been known for some time, and the advantages are numerous with respect to managing the wheelchair when it is not in use, or for transportation of the chair. Mostly this feature has been provided for relatively light-weight, manual wheelchairs. However, the same feature is an advantage for power wheelchair users who need to transport, and even occasionally to store their wheelchair. U.S. Pat. No. 4,840,390 relates to a folding mechanism for a power wheelchair which is used with a sling-type seat. However, many users prefer or even require rigid seating as provided by a van seat or a captain's seat structure. Thus, the purpose of the present invention is to provide a folding arrangement which when opened will provide a frame structure that can be used to support a rigid seat assembly such as a van seat or a recliner structure. The current invention is suitable for use on a power wheelchair; however, it is envisioned that it could also be used on a foldable manual wheelchair.

SUMMARY OF INVENTION

A positioning brace located on the base portion of one cross arm of a wheelchair supports the top portion of the remaining cross brace while a positioning link acts to position an upper horizontal and lower horizontal member of a side frame in a generally upright position. A corresponding position brace and positioning link are located on the other cross bar as well.

DETAILED DESCRIPTION OF THE INVENTION

Figure 1:
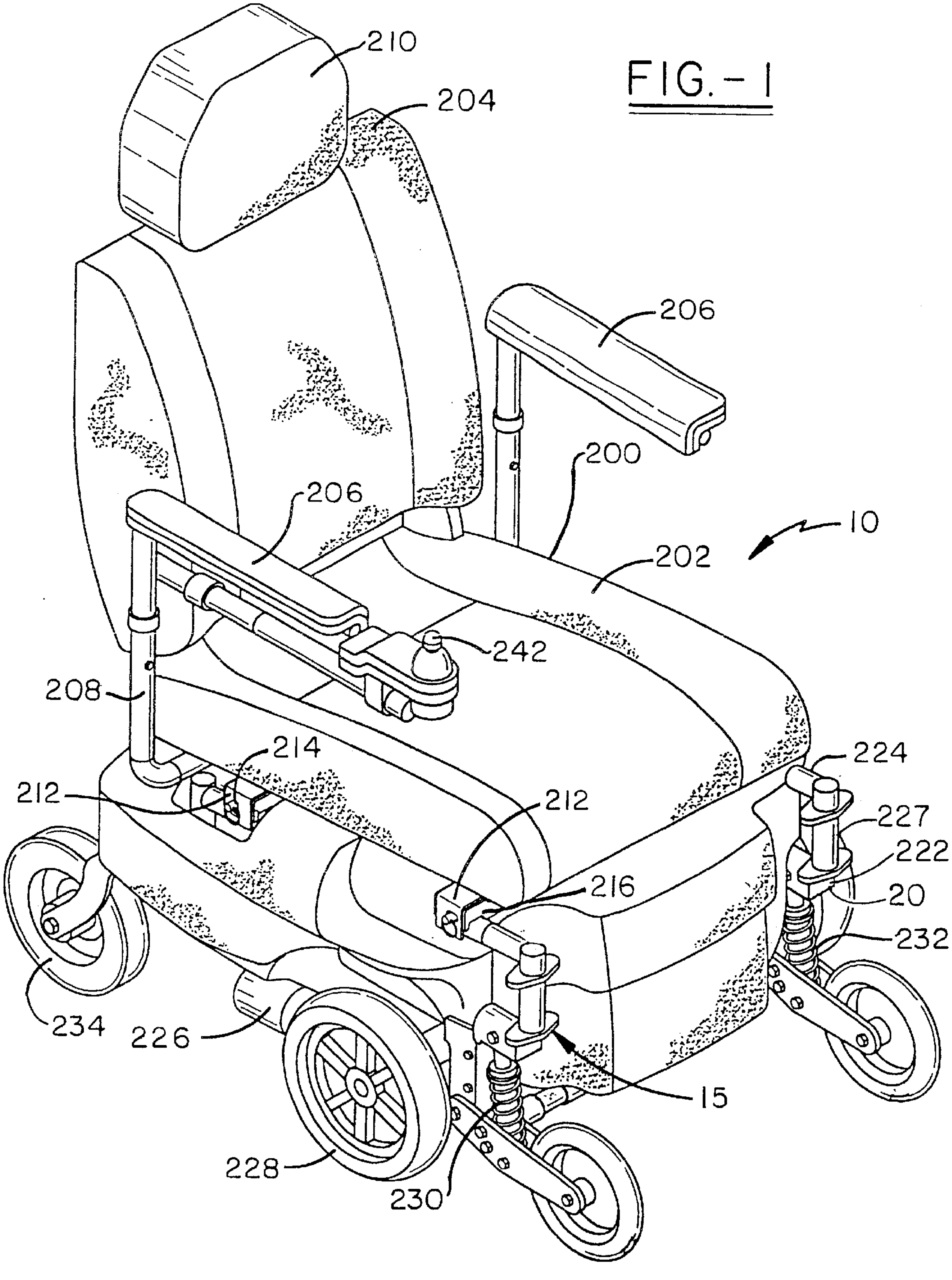
FIG. 1 is a top perspective view of a collapsible mid-wheel drive power wheelchair which can utilize the cross brace assembly in accordance with the present invention.

A foldable wheelchair, generally indicated by the numeral 10, contains frame 15 having two side frames 20. Each side frame has a generally horizontal lower member 222 and a generally shorter and horizontal upper member 224. When the side frame members are upright, the horizontal members 222, 224 are generally aligned in a plane. Side frame members 222 and 224 are connected to each other through a generally vertical front leg 227 and a generally vertical rear leg. Although the embodiment shown in FIG. 1 is a rectangular frame, it is to be understood that the various side frames can have other shapes such as rounded, triangular, and the like.

FIG. 1 shows a mid-wheel drive wheelchair of the sort suitable for use with the present invention having a van-type seat mounted to the side frames of the wheelchair. The wheelchair includes a seat member 200 having a bottom seat cushion 202, and a back 204. Arm rests 206 are mounted to frame members 208 and a head rest 210 is optionally provided. The seat is mounted by means of U-shaped clamp members 212 having a pin connection 214 to a mating mounting block 216 on the seat carriage. The carriage comprises upper and lower horizontal frame members 222 and 224 respectively. A motor 226 drives the respective drive wheels 228 on either side of the wheelchair. A front caster assembly 230 is provided including shock members 232. The chair is further supported on rear caster wheels 234. A joy-stick type control 242 is provided to interact with the motors 226 for control of the chair.

Figure 2:
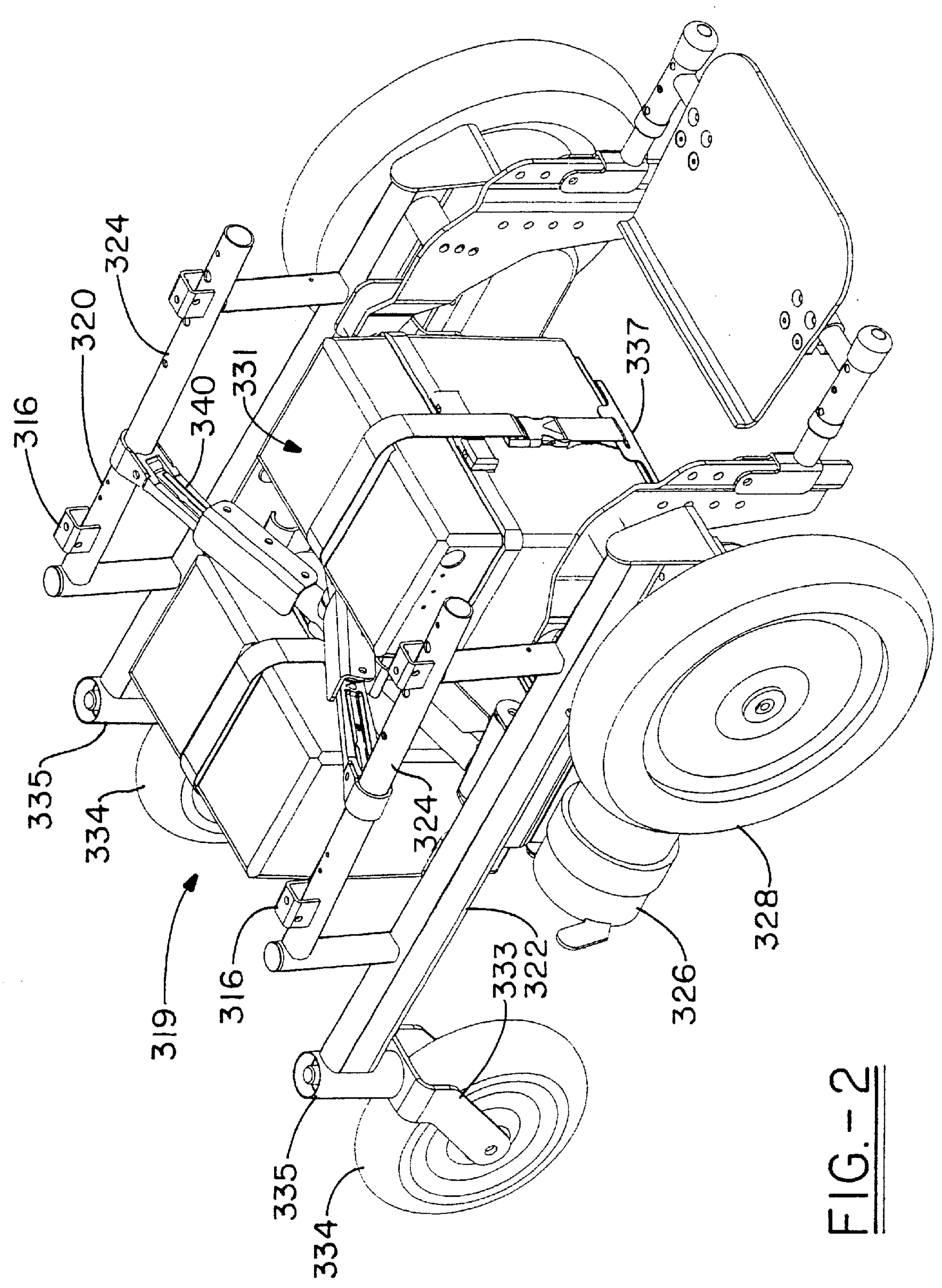
FIG. 2 is a top perspective view of a front-wheel drive wheelchair chassis showing the present cross brace assembly.
Figure 7:
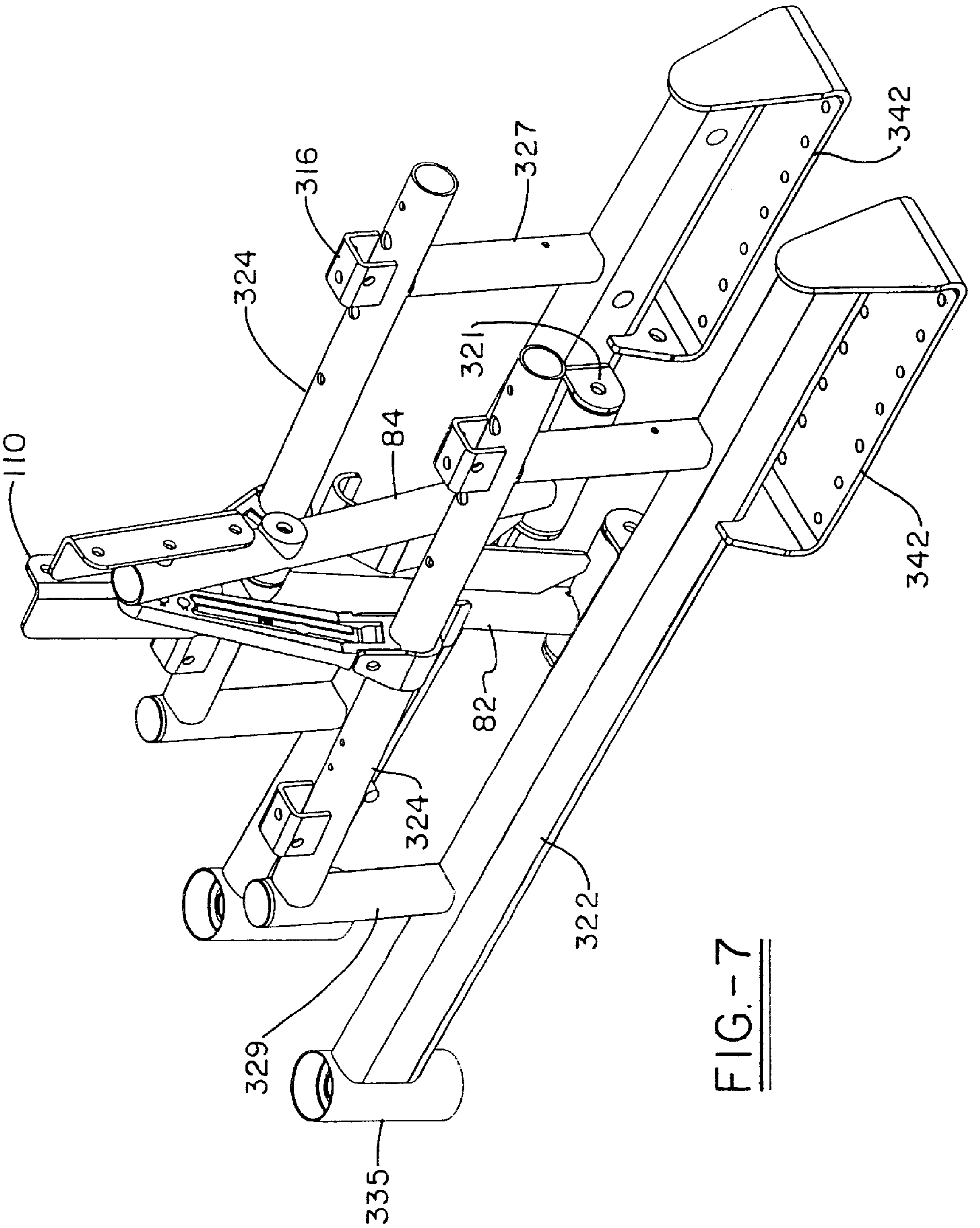
FIG. 7 is a top perspective of the cross brace assembly in a folded position.

Mounting blocks 316 are shown on the side frame assemblies of FIGS. 3, 5, 6 and 7. The carriage assembly for a front-wheel drive wheelchair is shown in FIG. 2. Specifically, it includes a carriage 319 having opposing side frame members 320 having an upper and lower horizontal member 324 and 322. As shown in FIG. 7, side frame members 322 and 324 are connected to each other through generally vertical front leg 327 and generally vertical back leg 329. The lower frame member is supported in the front by the axle of the drive wheel 328 and in the back through a yoked connection 333 to caster wheels 334. A pivot connection 335 is provided for the rear caster wheels.

The carriage 319 further includes a motor 326, which is controlled by standard controller means mounted from a bracket assembly from the lower brace member. Two batteries 331 are provided which are mounted on battery pan members 337, which are suspended from a battery pan bracket member so as to allow the battery pan to be folded at one longitudinal edge for collapsing of the chair. The carriage 319 further includes a cross brace assembly 340 in accordance with the present invention. The gear box mounts from the gear box mounting brackets 342 having multiple holes for positioning of the wheels relative to the wheelchair.

Wheelchair 10 can be a manual wheelchair or a power wheelchair such as a front-wheel drive, rear-wheel drive, or as shown in FIG. 1, a mid-wheel drive. Lower side frame member 322 supports a motor mounting bracket 342 which can be connected to any electrical motor 326 such as that shown. Through pendant brace a front-drive wheel 328 can be connected to the front end of a side frame. Similarly, through appropriate brackets, casters and the like, a rear wheel 334 can be mounted on the rear end of a lower side frame.

Figure 3:
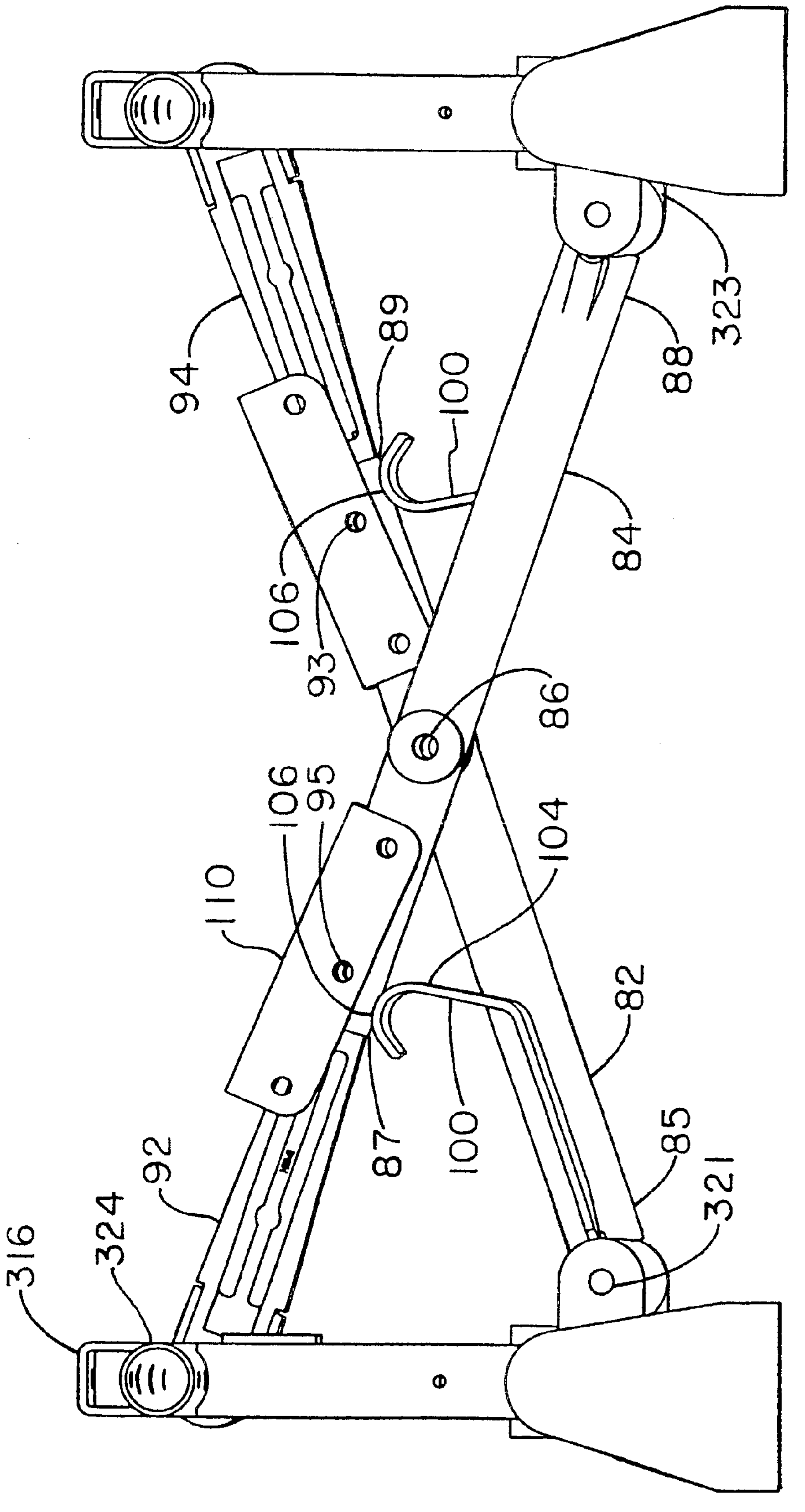
FIG. 3 is a front elevation view showing the positional brace located on a pair of cross arms of a foldable wheelchair.
Figure 4:
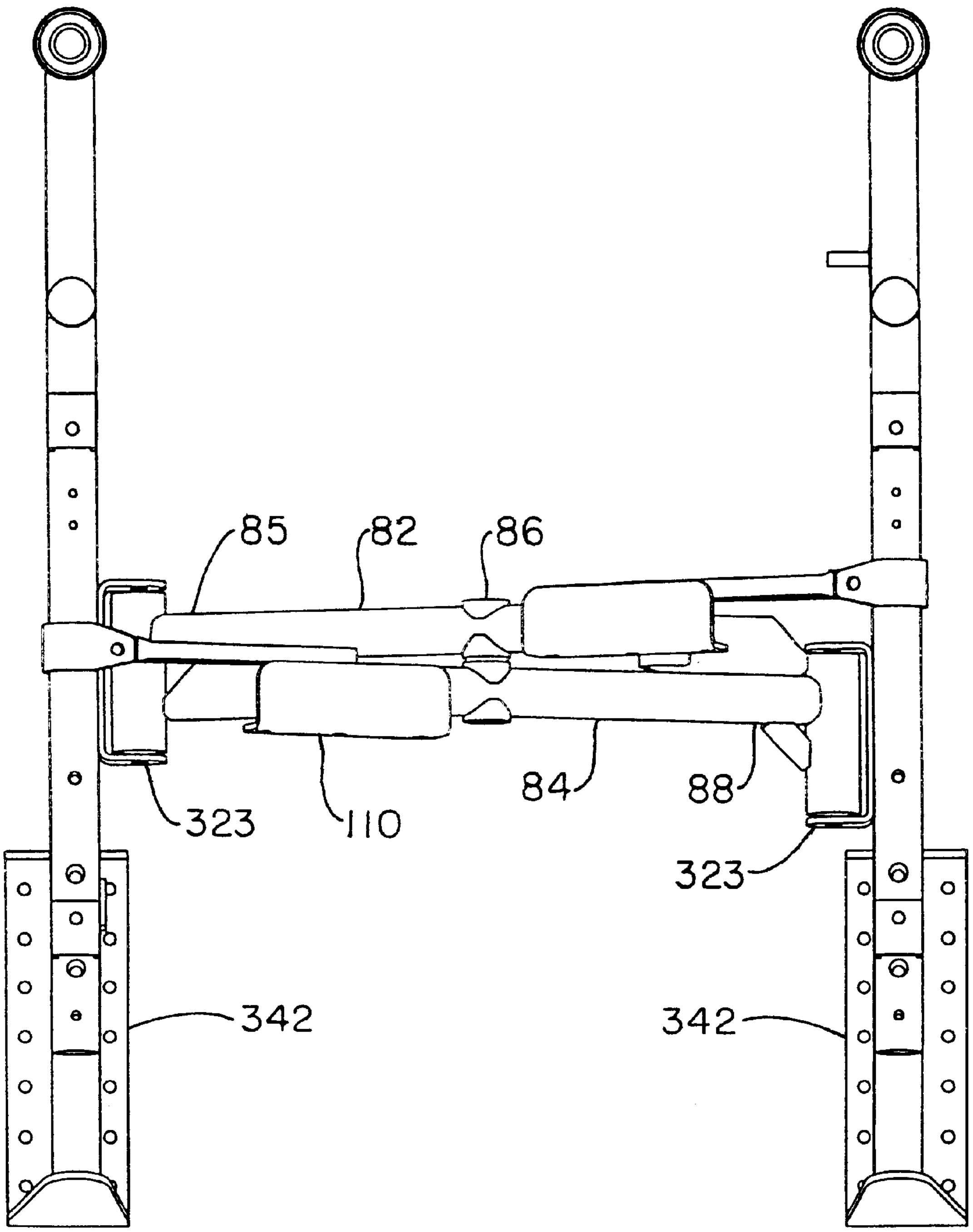
FIG. 4 is a top view of the cross brace of FIG. 3.
Figure 5:
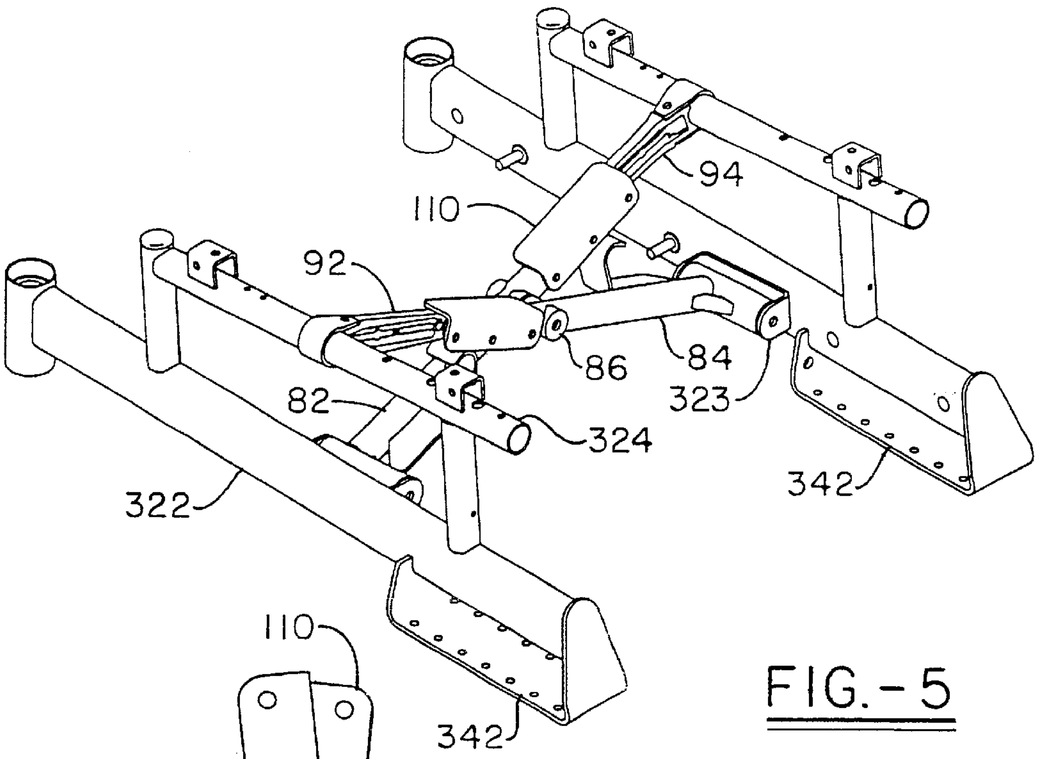
FIG. 5 is a top perspective view of the cross brace assembly of the present invention in an open position and attached to the side frame member of a front-wheel drive wheelchair.
Figure 6:
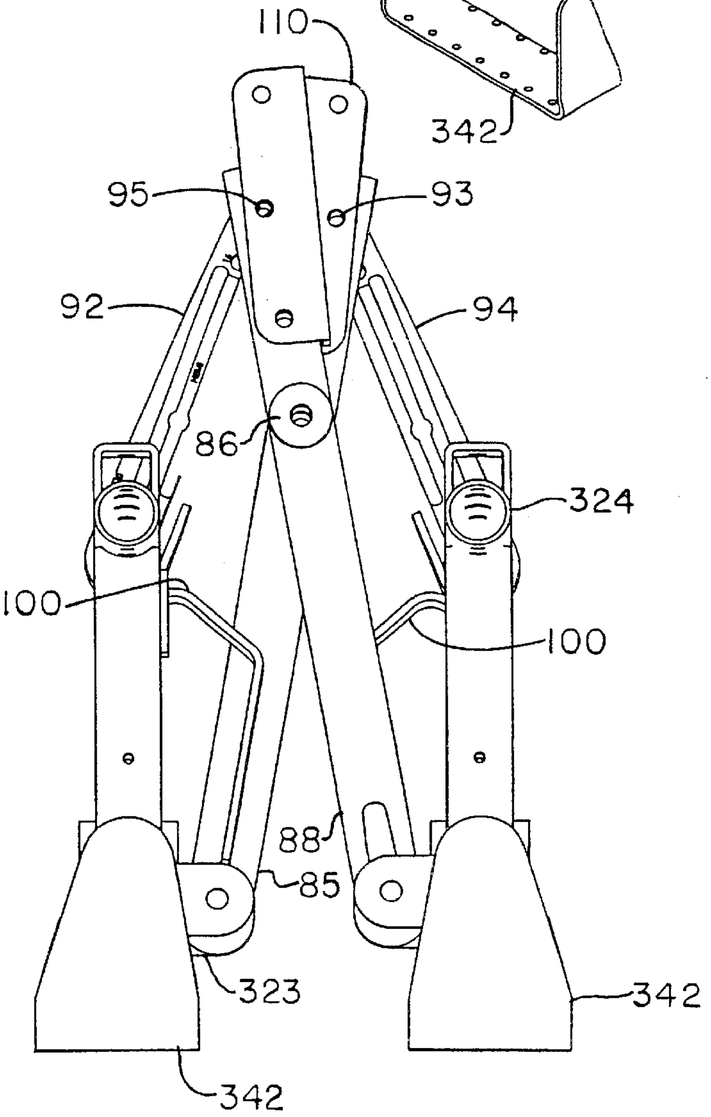
FIG. 6 is a front-view of the cross brace assembly in a folded position.

As seen in FIG. 3, cross arm assembly 340 includes two inclined cross arms such as left cross arm 82 and right cross arm 84, which are connected through pivot point 86 which can be a pivot pin residing within a corresponding aperture of each cross arm. The lower or base portion of each cross arm is connected as through a pivot connection 321 provided by brackets 323 to lower side frame member 322. The remaining member of each cross arm does not extend a significant distance from pivot point 86 to the upper side frame member 324. Rather, a positioning link 94 through pivot point or pin 93 located at the top portion or end 89 of the left cross arm and is pivotally attached to right upper side frame 324. This pivoting can be achieved using a collar which slides around the frame member tube 324. Similarly, positioning link 92 located at top end 87 of the right cross arm is pivotally attached through pivot point or pin 95 to the remaining upper left cross frame member 324.

In order to properly position one side frame vertically as well as laterally with respect to the remaining side frame, the inclination of the two cross arms with respect to one another is set at a predetermine angle through the use of a positional support or brace 100. The use of each positional brace to support the upper (i.e., outward from the pivot point and upward from the ground) end of the opposite cross arm causes the cross brace assembly to be self-supporting in the open position (i.e., at fixed distance.) The weight load is carried by the support braces 100 when the assembly is in the correct width operating position. As best seen in FIG. 3, positional brace 100 can be connected as by welding to base portion 85 or 88 of the corresponding cross arm. The positional brace has generally a vertical element 104 and terminates in a curvilinear or rounded engagement portion 106. The height of the positional brace is so adjusted such that upon movement of top portions 87, 89 of the cross arms to a downward position, it engages a positional brace on the remaining cross arm so that through positioning links 92 and 94, a desired lateral distance as well as vertical orientation of the two side frame members is achieved. Inasmuch as positional links 92 and 94 are not constrained in any manner, they generally do not transfer any load bearing force, i.e., weight, but merely serve as substantially a positioning link.

When it is desired to fold the wheelchair, seat 200 is removed as by pulling quick release pins 214 laterally outward and raising the seat to remove it from the wheelchair. Then lift brackets 110 are pulled upwardly to raise the top portions of the cross arms and thereby move side frames 320 laterally inwardly to fold or collapse the wheelchair. Upon utilization of the wheelchair, the operation is reversed. That is, lift brackets 110 are pushed downwardly to force the cross arms towards a horizontal position until top end portions 87 to 89 thereof contact positional brace 100. The seat can then be installed.

While in accordance with the patent statutes the best mode and preferred embodiment has been set forth, the scope of the invention is not limited thereto, but rather by the scope of the attached claims.

What is claimed is:

1. A cross brace assembly for use on a wheelchair having a seat and at least two wheels, said wheelchair comprising a first side frame member opposing a second side frame member, each of said side frames respectively having a top portion which supports a portion of said wheelchair seat and having a second lower portion which supports at least one of the wheels of the wheelchair, said cross brace assembly comprising:

a pair of cross arms having an intermediate pivot point connecting said cross arms, each of said arms having a lower end pivotally connected to the lower portion of one of said side frame members;

a support attached to a lower portion of at least one of said cross arms which non-latchingly contacts and supports an upper end of the other of said cross arms when the cross brace assembly is in an open position; and two positioning links, each said link pivotally connected at one end to the top portion of a respective said side frame member and pivotally connected at the other end to a respective said cross arm upper end so that said positioning link substantially does not transfer any bearing load between said side frame member and said cross arm upper end, said cross brace assembly connecting and allowing pivotal movement between said side frame members.

2. A cross brace assembly as set forth in claim 1, wherein each of said cross arms has one of said supports, wherein each said supports has at least a generally vertical portion extends upward from a lower portion of a respective one of said cross arms and has a substantially rounded engagement area upon which said upper portion of the other of said cross arms non-latchingly rests in said open position.

3. A cross brace assembly as set forth in claim 2, wherein upper portions and lower portions of said cross arms are separated by said intermediate pivot point.

4. A cross brace assembly as set forth in claim 3, wherein said intermediate pivot point includes a space assembly which maintains the transverse axes of said cross arms in a parallel position.

5. A cross brace assembly as set forth in claim 4, wherein said intermediate pivot point comprises a first and second coved washer separated by a low friction washer bearing.

6. A collapsible wheelchair comprising:

a first and second side frame assembly each having a top frame member and a lower frame member, which in combination in an open position support a rigid seat, and a cross brace assembly interconnecting said side frame assemblies and allowing pivotable movement therebetween, said cross brace assembly comprising:

first and second cross arms each of which has a lower portion pivotally connected to a respective one of said lower side frame members, and an upper portion located upward of a scissoring-type pivot point between and connecting said cross arms, said upper portion operatively connected to said top frame member;

each of said cross arms having a support member located on a lower portion of said cross arm which non-latchingly supports and contacts said upper portion of the other of said cross arms when said cross brace assembly is in an open position.

7. A collapsible wheelchair as set forth in claim 6, wherein said cross brace assembly further comprises first and second positioning links each respectively pivotally engaging said top frame member and substantially an end of said upper portion of one of said cross arms so that said positioning link substantially does not transfer any bearing load between said side frame member and said cross arm upper end.

8. A cross brace assembly as set forth in claim 7, wherein each said support member has a generally vertically oriented component having a substantially curvilinear support surface, said support surface non-latchingly engaging a surface of the respective cross arm upper portion when said wheelchair is in said open position.

9. A wheelchair, comprising;

a wheelchair frame including two side frames, each side frame having a generally horizontal lower member and a generally horizontal upper member;

a pair of cross arms, each cross arm at a base portion thereof pivotally connected to a different said lower side frame member, the top portion of each cross arm being pivotally connected to a positioning link so that said positioning link substantially does not transfer any bearing load between said side frame member and said cross arm upper end;

each said positioning link being pivotally connected to a different upper side frame member;

at least one said cross arms at the base portion thereof having a positioning brace connected thereto, said positioning brace including an upper portion which non-latchingly contacts and supports the top portion of the remaining cross arm so that the corresponding side frame is substantially vertically positioned and laterally positioned at a predetermined distance with respect to the remaining side frame, and said cross arms and said positioning links allowing pivotal movement between said side frames.

* * * * *